United States Patent [19]

Lynk

[11] 4,167,753
[45] Sep. 11, 1979

[54] PEAK DETECTING DIGITAL SCAN CONVERTER

[75] Inventor: Edgar T. Lynk, Schenectady, N.Y.

[73] Assignee: General Electric Company, Schenectady, N.Y.

[21] Appl. No.: 825,529

[22] Filed: Aug. 18, 1977

[51] Int. Cl.² .............................................. H04N 7/18
[52] U.S. Cl. ..................................... 358/140; 73/611; 358/112
[58] Field of Search ................... 358/112, 140; 73/611

[56] References Cited

U.S. PATENT DOCUMENTS

| | | | |
|---|---|---|---|
| 3,864,660 | 2/1975 | Ranalli | 73/622 |
| 3,864,661 | 2/1975 | Ranalli | 73/622 |
| 4,057,836 | 11/1977 | Munsey | 358/140 |
| 4,058,001 | 11/1977 | Waxman | 358/112 |
| 4,063,451 | 12/1977 | Dory | 358/112 |
| 4,070,905 | 1/1978 | Kossoff | 73/614 |

Primary Examiner—Howard W. Britton
Attorney, Agent, or Firm—Donald R. Campbell; Joseph T. Cohen; Marvin Snyder

[57] ABSTRACT

An ultrasonic multi-sector scanner performs overlapping scans such that echoes are generated by many steered beams. A peak reading digital scan converter has a random access memory with a matrix of memory cell locations corresponding to image pixels. An analog or digital comparator compares the incoming echo amplitude with the stored amplitude at an addressed memory location, and writes the incoming data into that location only when the incoming amplitude is larger. The stored largest echo amplitude data is read out in a raster at TV rates for imaging on a cathode ray tube.

3 Claims, 8 Drawing Figures

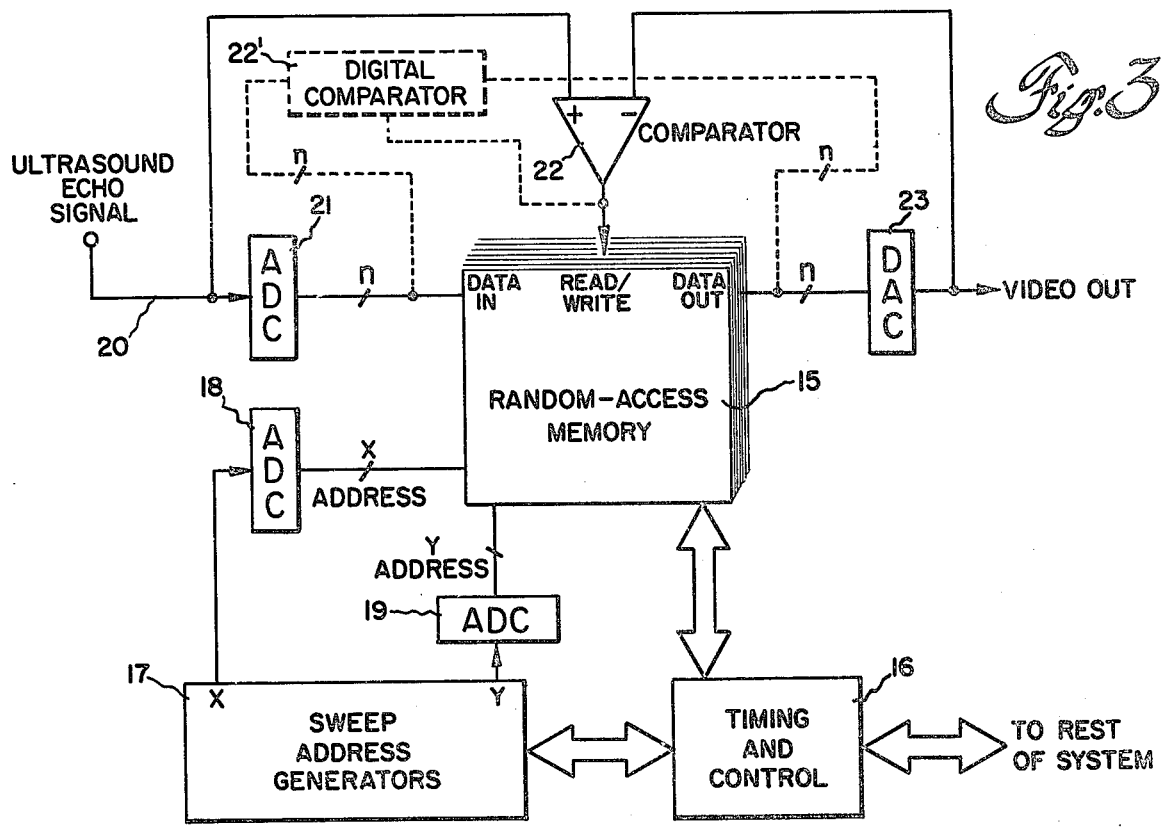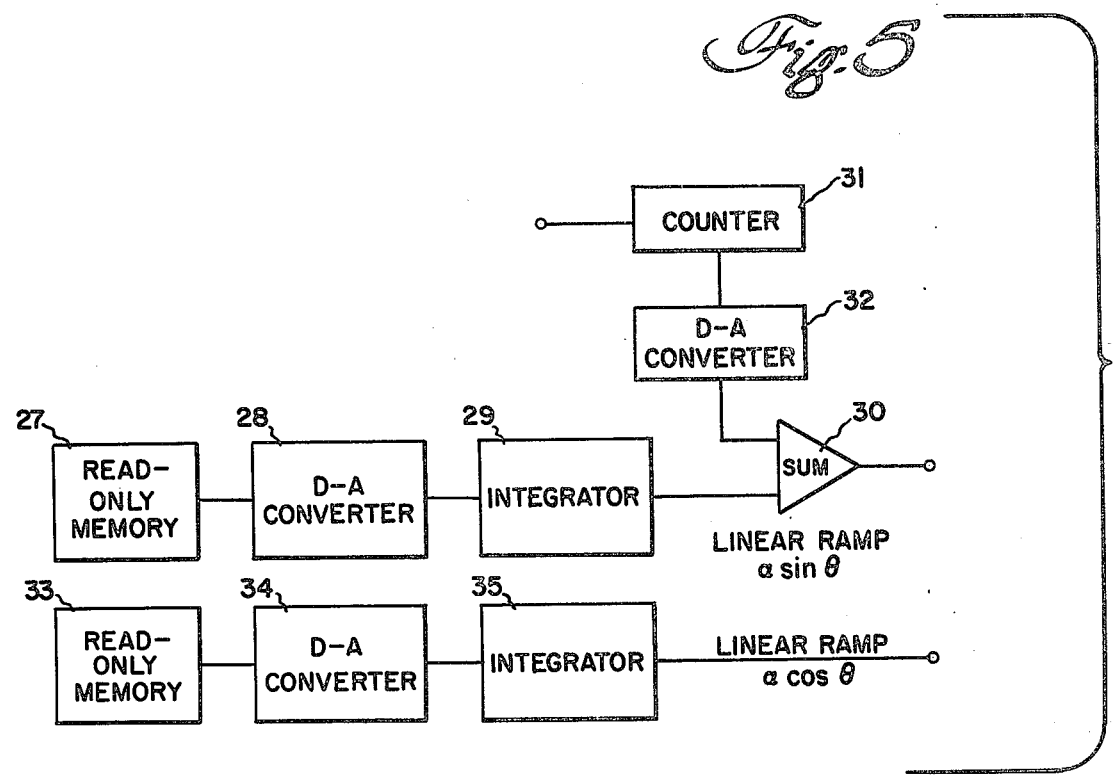

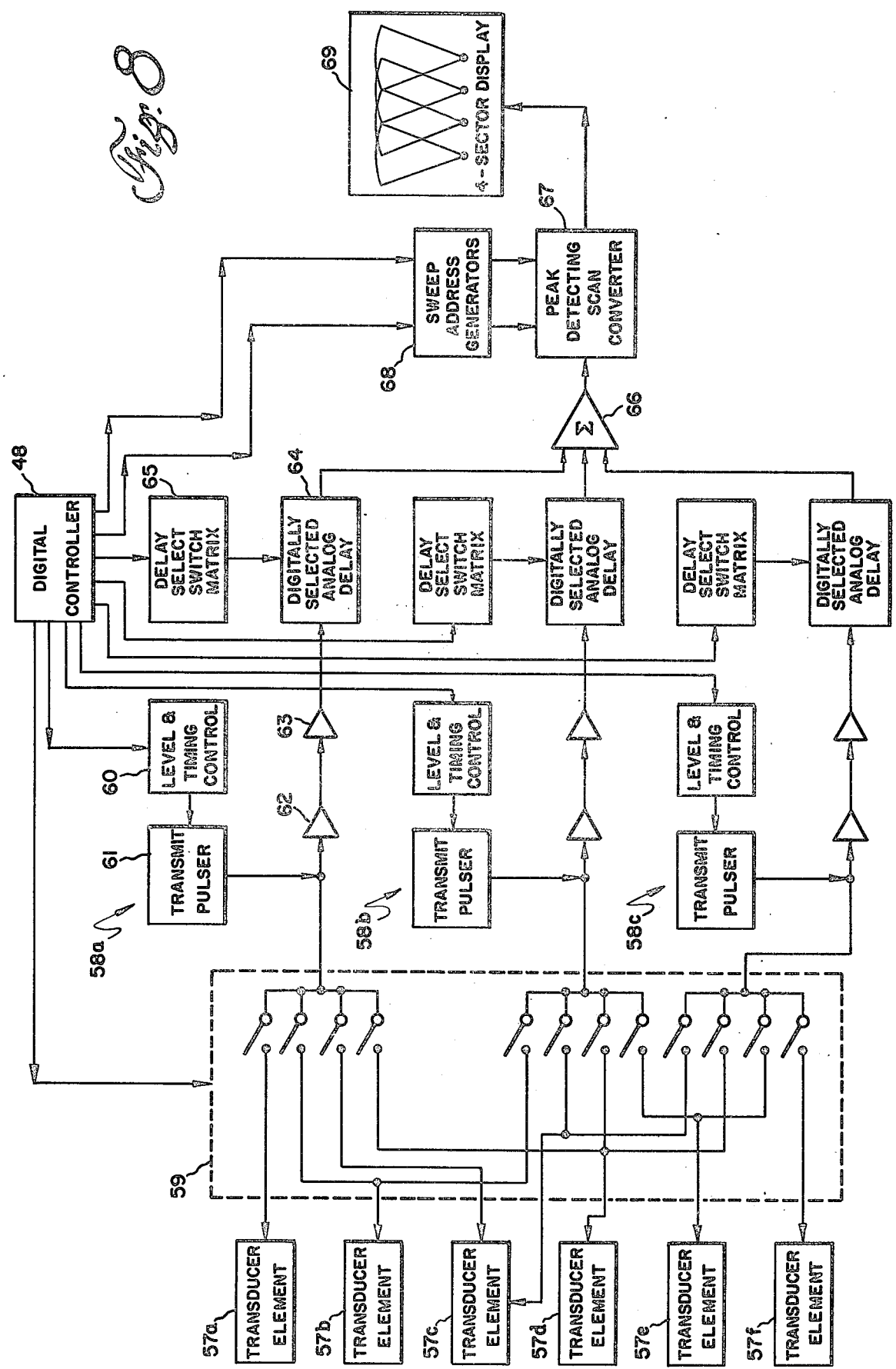

PEAK DETECTING DIGITAL SCAN CONVERTER

BACKGROUND OF THE INVENTION

This invention relates to scan conversion apparatus for converting scan data sensed in non-raster format to a raster scan format for display on a conventional cathode ray tube (television monitor). More particularly, the invention relates to a peak detecting digital scan converter for an ultrasonic multi-sector scanner for storing and reading out for display only the largest amplitude echo data for image points covered by overlapping sector scans.

The multi-sector scanner or "walking beam" ultrasonic imaging system has been suggested as a way to improve the quality of ultrasound echo images. This real time imaging system has a linear transducer array as depicted in FIG. 1 for producing a set of sector scans with the origin points of the sequential sector scans displaced longitudinally along the array. For each sector scan a sub-array of transducer elements are excited in time sequence to generate angulated acoustic beams at many different angles relative to the normal at the midpoint of the sub-array. Directional pulses of ultrasound impinge upon the object of interest at varying angles, and the system is characterized by an increase in the range of total viewing angles which improves reception of specular reflections. This ultrasonic scanning system is described in concurrently filed application Ser. No. 825,528 by H. A. F. Rocha and C. E. Thomas, entitled "Ultrasonic Multi-Sector Scanner", and assigned to the assignee of this invention.

Because insonification of interior objects takes place at varying angles, any given point of the object can produce echoes from many different acoustic beams. To store and display all these echoes at the same pixel (picture element) of a cathode ray tube display device would improperly enhance or perhaps partially white-out overlapping areas of the field of view. Therefore, it has been suggested that the image be displayed using an analog storage tube or scan converter tube operated in a "peak detection" mode, in which the largest signal to be written on the target is the signal finally stored on the target. In this mode of operation, no accumulatin of charge takes place over and above that needed to reflect the largest signal written onto a given part of the target. However, analog storage tubes are sensitive, difficult to align, nonuniform and nonlinear.

SUMMARY OF THE INVENTION

The peak detecting digital scan converter according to an exemplary embodiment is comprised by a random access digital memory having a matrix of memory cell locations each corresponding to an image pixel, wherein the memory locations are accessed in random order for the writing of incoming digital echo amplitude data and for the reading out of stored echo amplitude data by the coincidence of memory address signals on X and Y select lines. Sweep address generator circuitry successively generates digital X and Y line memory addresses to select a predetermined sequence of memory locations which in combination define and angulated image scan line. Incoming ultrasound echo signals are digitized and also fed in analog form to an analog comparator, and simultaneously the stored echo amplitude data in a currently addressed memory location or pixel is fed to the comparator through an output digital-to-analog converter. The comparison can also be made with a digital comparator. The comparator output conditions the radom access memory to write digitized echo amplitude data into the addressed memory location only when the incoming echo amplitude is larger than the stored echo amplitude; otherwise that location is left alone and the sweep generators are incremented to the next memory location or pixel. At the conclusion of data entry, the stored largest echo amplitude data is read out at television rates by sequentially generating the X and Y line memory addresses in a raster, and the analog output signals are used as the Z control to determine the electron beam intensity in a cathode ray tube.

In one embodiment of the sweep address generator circuitry the memory address signals are generated by analog voltages or linear ramps proportional to the sine and cosine of the angulated scan line being imaged; in another embodiment digital logic including rate multipliers and counters directly generates the digital memory addresses. Provision is made to offset either the X or Y memory as determined by the sector number being scanned in a multi-sector ultrasonic scanner. The peak reading digital scan converter has other applications for the conversion of non-raster scan data to raster format for display on a cathode ray tube or for transfer to a permanent storage medium.

BRIEF DESCRIPTION OF THE DRAWINGS

FIG. 3 is a schematic block diagram of the peak detecting digital scan converter according to one embodiment having the memory addresses generated by analog voltages;

FIG. 5 is a functional block diagram of one form of the analog voltage sweep generator circuitry in FIG. 3;

FIG. 8 is a functional block diagram of a four-sector scanner imaging system incorporating the present peak reading digital scan converter.

DESCRIPTION OF THE PREFERRED EMBODIMENTS

The peak reading digital scan converter apparatus according to the preferred embodiment converts angulated sector scan echo amplitude data to raster scan format for storage or visual display, in steered beam B-scan ultrasonic imaging systems where there are two or more overlapping sector scans, and only the largest echo amplitude is retained in overlapping areas of the field of view. This is accomplished by a multi-plane random access digital memory and an analog or digital comparator to determine which data, current or previous, should be stored in a given pixel or memory location. The stored largest echo amplitude data is then read out sequentially row by row in a raster at television rates to control the intensity of the electron beam of a cathode ray tube. Of course, the digital echo data can be transferred to a storage beam medium like floppy disk for permanent storage.

Figure 1:
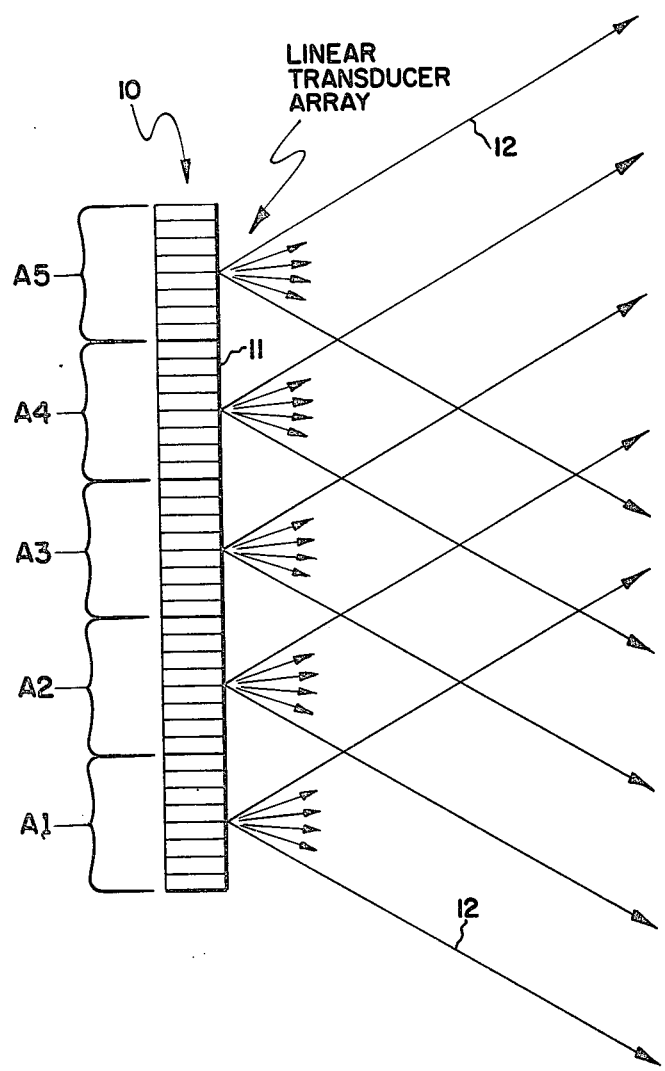
FIG. 1 is a schematic side view of the linear transducer array of an ultrasonic multi-sector scanner and imager, showing a five sector scan.

In FIG. 1, the ultrasonic multi-sector scanner disclosed and claimed in the aforementioned Rocha and Thomas application employs a long linear transducer array 10 with a total number of elementary transducers 11 considerably greater than the number required to scan a single sector as in the prior art single sector scanners. The linear transducer array here illustrated is divisible into five subarrays of transducer elements, each operable to perform a sector scan, with the origin points or sectors displaced longitudinally along the array between sector scans. For real time imaging at a typical frame rate of thirty frames per second, the system also requires a television monitor or other type display device on which the total image is built up line by line from the scan converter memory. The transducer elements of the first sub-array A1 are energized sequentially by excitation pulses in a time sequence to form an ultrasound beam 12 and direct the beam in a preselected azimuth direction to transmit a pulse of ultrasound. During reception the received echo signals are delayed in the reverse order to focus the echoes, and the delayed echo signals from all the transducer channels are summed and fed to the scan converter. In succeeding transmit-receive cycles, the channel-to-channel time delays are progressively changed to rotate the generated acoustic beam by small angular increments in the counterclockwise direction toward the normal, and then the relative time delays are reversed and the beam is rotated by increments in the clockwise direction toward the normal to make up additional acoustic scan lines. Then a second sub-array A2 of transducer elements with its center displaced longitudinally on the array is energized to form another set of angulated acoustic beams and build up a second sector sub-frame of the composite image, and this process is repeated for sub-arrays A3, A4, and A5 until the entire image frame is complete. The number of sub-arrays can be two or more, and the array center displacement increment between sector scans can be any multiple of the basic array element center-to-center spacing. For all such arrangements, the individual circular sector scans are at least partially overlapping, and any given point of the object being insonified can produce echoes from two or more different beams.

Figure 2:
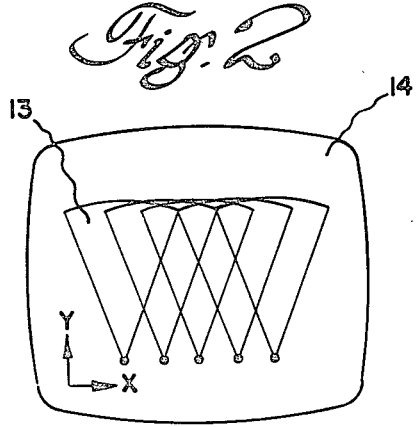
FIG. 2 illustrates a five sector display on a television monitor.

In FIG. 2 a five sector 13 depicting a tomographic slice of the insonified object region is displayed in real time on the screen of a cathode ray tube 14, which is a conventional television monitor. It is seen from the foregoing description that an electronically controlled, steered ultrasound beam is generated that is capable of both oscillating motion about the sector origin point and translation along the array to a different origin point. For each transmitted steered ultrasound beam there is a corresponding focused received echo electrical signal which is fed to the peak reading digital scan converter and is data for the corresponding image scan line. This is further explained in detail later with regard to FIG. 8. The scan converter makes the conversion from the sector scan format to raster scan format, and in overlapping areas of the field of view selects for imaging on a pixel-by-pixel basis only the largest echo amplitude data. The multi-sector scanner has both industrial and medical applications, and is especially advantageous in medical diagnostics for cardiology and laminography. To image a portion of the heart, linear transducer array 10 is manually held against the patient's chest wall while observing the image on cathode ray tube 14, and its position is changed until the desired portion of the heart is imaged. A frame rate of about thirty frames per second is needed to prevent blurring of the image due to heart motion.

Referring to FIG. 3, the peak detecting digital scan converter is comprised by a multi-plane random access memory 15 for storing at preselected memory locations, in digital form, the ultrasound echo amplitude data. Random access memory 15, has, for example, five to ten bit planes, each with $256 \times 256$ pixels or memory locations. Various types of solid state memories can be used in the practice of the invention, such as an MOS (Metal-Oxide-Semiconductor) field effect transistor memory or possibly a bipolar transistor memory. Although there are many configurations of these memories available, they can be viewed basically as a matrix of active transistor devices or storage cells which require the coincidence of signals on X and Y address lines in order to change the binary state of the cell and write echo signal data into that memory location. To nondestructively read information out of the memory cell during the read segment of the cycle, coincidence of the signals on the X and Y address lines is also required. It is essential that memory 15 be a random access memory, i.e., that echo signal data can be written into and read out of the memory locations in any order by supplying the X and Y addresses in sequence.

In one embodiment the memory addresses for writing new echo signal data or for reading out stored echo amplitudes are generated by analog voltages which are subsequently converted to digital form. In a second embodiment the X and Y memory addresses are generated directly by special digital logic. In the first implementation, timing and control circuitry 16 such as that illustrated in FIG. 8 interacts with sweep address generators 17 and also with random access memory 15. The sweep address generators 17 are operative to produce linear ramp voltages with predetermined inclinations, one representing a sequence of X memory addresses and the other a sequence of Y memory addresses. The linear ramp voltages are digitized at a relatively fast rate by analog-to-digital converters 18 and 19, and the resulting address information defines the sequence of memory locations to be accessed. The convention adopted here is that X is the horizontal direction on a television screen while Y is the vertical direction (see FIG. 2).

The focused and summed ultrasound echo signal at data input line 20 is first digitized at a relatively fast rate in an analog-to-digital converter 21 before being fed as n-bit echo amplitude data to random excess memory 15. Assuming that A-D converters 18, 19, and 21 are operating at the same digitization rate, echo data is written into the accessed memory location only if the amplitude of the new data is larger than the stored echo amplitude, if any. For this purpose, the analog echo signal on input line 20 is also fed to the noninverting input of an analog comparator circuit 22, where it is compared with the read-out echo amplitude data for the currently addressed memory location. The stored n-bit echo amplitude data is read out through an output digital-to-analog converter 23 before being applied in analog form to the inverting input of comparator 22. The comparator output voltage level is high when the new echo amplitude is higher than the stored echo amplitude, and is low for the reverse situation. The comparator output is connected to the read/write logic in random access memory 15, and a high comparator output sets the logic to the write state while a low output sets the logic to the read state. As the incoming echo signal is successively digitized, digital X and Y memory address signals are generated at the same rate, and for each addressed memory location (which corresponds to an image pixel) the sequence of reading out the stored echo data, comparing stored and incoming echo amplitudes and writing into the memory location only when the incoming echo amplitude is higher, proceeds. Note that the signal comparison can be performed digitally with a commercially-available device such as a Type 74LS 85 manufactured by Texas Instruments, Inc. Digital comparator 22' and its connections in the system are illustrated in dashed lines.

Figure 4:
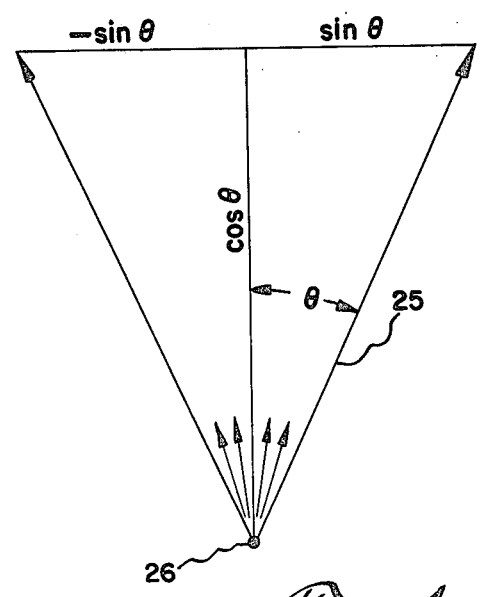
FIG. 4 depicts definition of a scan line by a set of sine and cosine coefficients.

Referring to FIG. 4, every angulated acoustic scan line 25 capable of incremental rotation about the sector origin point 26 can be defined by a set of sine and cosine coefficients or other preselected direction coefficients for the angle $\theta$, with $\theta$ being defined as the angle between scan line 25 and the normal to the transducer array at the origin point. As scan line 25 is incremented, by say 1.5°, the pairs of sine and cosine values define the group of angulated scan lines. For a total scan angle ($2\theta$) in the range of 60° to 90°, scan lines at one side of the normal have positive sine coefficients and scan lines of the other side of the normal have negative sine coefficients. FIG. 5 illustrates one possible configuration of sweep address generators 17 for producing analog voltages. In the case of the X memory addresses, the linear ramp voltage is proportional to sin $\theta$ and the dc level of the ramp determines which of the five sectors is being imaged. A read-only memory 27, which can be part of the digital controller in FIG. 8, contains the sine coefficients for the multiple angulated scan lines. Upon command from the digital controller, the appropriate sine coefficient is read out as a current proportional to the magnitude of the number. A digital-to-analog converter 28 produces corresponding analog current level which is fed to an integrator 29. The linear ramp voltage has an inclination and polarity proportional to the magnitude and polarity of sin $\theta$, and is summed with one of five dc voltage levels (including zero volts) in a summing amplifier 30. Upon switching from one transducer subarray to the next to change the origin of the sector scan, an input pulse from the digital controller is applied to a counter 31, and the dc voltage at the output of digital-to-analog converter 32 is proportional to the pulse count. Thus, the X address analog voltage at the output of summing amplifier 30 changes as the scan line is incrementally rotated to make a sector scan, and is offset by different amounts as the second through fifth sector scans are performed. The Y memory address linear ramp voltages are proportional to cos $\theta$, but have only one sign and dc offset voltages are not required. In similar fashion, the sweep address generator circuitry includes a read-only memory 33 for storing the different values of cos $\theta$ for a single sector scan, a digital-to-analog converter 34, and an integrator 35. In operation, the digital controller simultaneously addresses both read-only memories 27 and 33 to read out corresponding pairs of values of sin $\theta$ and cos $\theta$.

Figure 6:
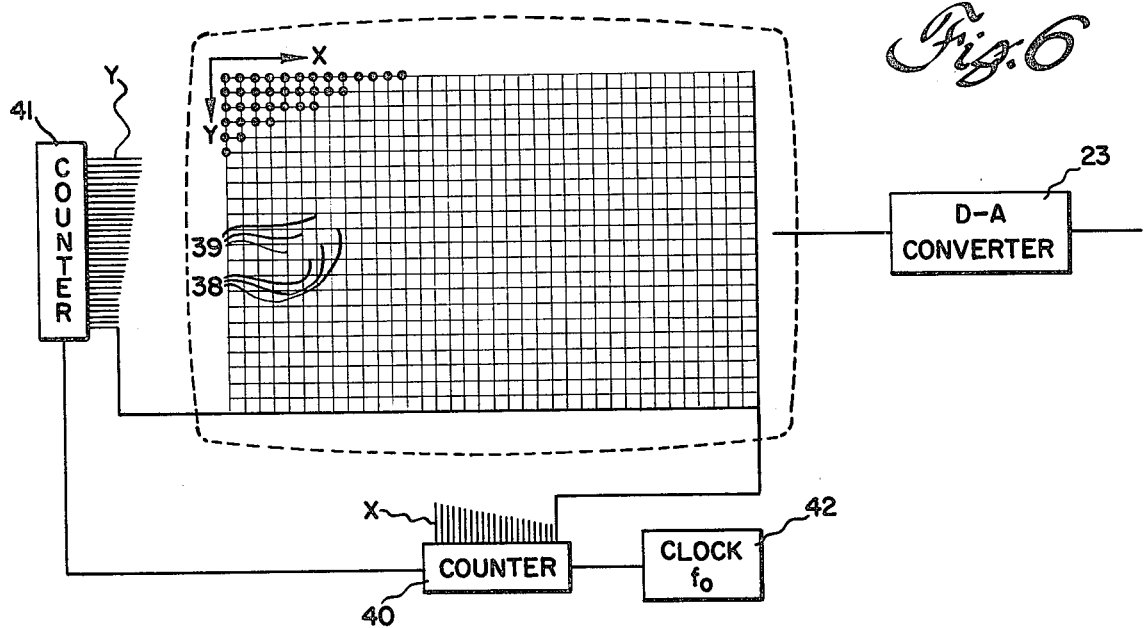
FIG. 6 is a diagrammatic plan view of one bit plane of the random access memory with provision for reading out at TV rates the stored largest amplitude echo data.

The final image is viewed by running the X-Y memory voltages in a raster at TV rates and displaying on a television monitor. FIG. 6 is a diagrammatic sketch of one bit plane of random access memory 15, illustrating the rectangular grid of X select lines 38 and Y select lines 39 at the intersections of which are dots representing memory locations or corresponding image pixels.

An element counter 40 and a line counter 41 have plural stages respectively equal in number to the number of X lines and Y lines, and the final stage of the element counter is connected to the first stage of the line counter. A master clock 42 having a TV synchronized clock frequency $f_o$ supplies clock pulses to element counter 40 and also an initial pulse to line counter 41 by a connection not here shown. As one Y line is energized, the X lines are energized in sequence to sequentially read out the stored echo amplitude data at those memory locations. Then line counter 41 is indexed by a pulse from the final stage of element counter 40 to thereby energize the second Y line, and element counter 40 is reset to count down from the first to the final stages as before, and so on. The readout raster scanning of the stored echo amplitude data from the multiple bit planes of random access memory 15 can take place after all data is taken or the two processes of writing in data and finally reading out the stored data for image formation may partially overlap. The read-out echo data passes through output digital-to-analog converter 23 before being fed to the cathode ray tube and determines the intensity of the electron beam, i.e., is the Z control of the cathode ray tube.

Figure 7:
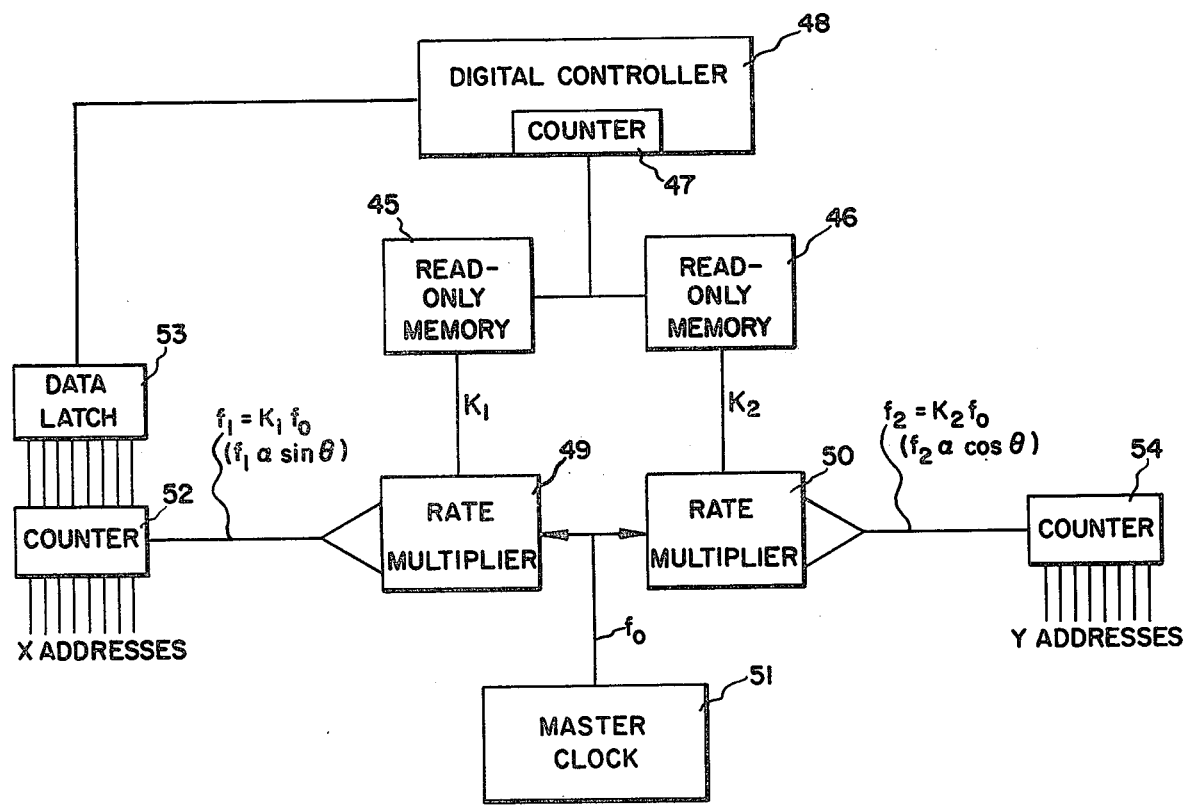
FIG. 7 is a block diagram of the preferred form of sweep address generator circuitry implemented with digital logic.

FIG. 7 is a block diagram of the preferred form of sweep address generator circuitry 17 implemented with digital logic (A-D converters 18 and 19 in FIG. 3 are not required). As in FIG. 5, the sin $\theta$ and cos $\theta$ scan line direction coefficients are stored in read-only memories 45 and 46, and the appropriate sections of the memory are addressed successively by a counter 47 in digital controller 48. The n-bit coefficients may be referred to as rate input constants $k_1$ and $k_2$ and are fed to rate multipliers 49 and 50, both of which are simultaneously supplied with clock pulses at a frequency $f_o$ generated by a master clock 51. With the rate multipliers enabled, the output frequencies $f_1$ and $f_2$ are respectively equal to the input frequency $f_o$ multiplied by the rate input $k_1$ or $k_2$. Rate multiplier 49 thus generates output clock pulses with a frequency $f_1$ proportional to sin $\theta$ that are fed to a binary up/down or reversible counter 52 with preset inputs from a data latch 53. The output data of counter 52 are the binary X memory addresses. On the other side, rate multiplier 50 generates output clock pulses with a frequency $f_2$ proportional to cos $\theta$. These pulses are fed to an up/down counter 54 at the outputs of which are the binary Y memory addresses.

Various modes of operation are possible for the digital memory address generating logic in FIG. 7. One mode is to repeatedly turn on master clock 51 for a constant time. The rate of generation of output pulses from rate multipliers 49 and 50 depends upon the sine and cosine coefficients read out by read-only memories 45 and 46 upon command from counter 47. Assuming that counters 52 and 54 are preset to zero, the generated X and Y memory addresses depend upon the number of pulses during the constant time period. At the same time that master clock 51 is turned on, the ultrasound echo electrical signal on data input line 20 (FIG. 3) is digitized, and at the end of the constant interval the digitized data is written into random access memory 15 at the addressed and accessed memory location. This sequence is repeated until the end of the scan line is reached, then the sine and cosine coefficients are changed and counters 52 and 54 are set to zero to generate X and Y memory addresses for the next scan line of the same sector. To generate memory addresses for the next sector, data latch 53 is loaded with origin point address data from digital controller 48, which is then applied to the input data terminals of counter 52 to change the beginning count from which the up counting and down counting commences in the manner previously explained. Thus, the generated X memory addresses are shifted or offset to permit writing data into the next section of random access memory 15. The contents of data latch 53 are changed in corresponding fashion for the third, fourth, and fifth sector scans. This digital memory address logic can be implemented with conventional available components; for instance, binary rate multipliers 49 and 50 can be Type SN 5497 or SN 7497 manufactured by Texas Instruments, Inc., binary up/down counters 52 and 54 can be Type N 74193 manufactured by Texas Instruments, Inc., and data latch 53 can be Type 3404 manufactured by Intel Corp.

To clarify the application of the peak detecting digital scan converter in a multi-sector scanner ultrasonic imaging system, one embodiment disclosed in the aforementioned Rocha and Thomas application is depicted in FIG. 8. For purposes of illustration this is a four sector scan imager with a three element beam former, but in practice a larger number of transducer elements are included in each subarray or beam former. The four sub-arrays of contiguous transducer elements are elements 57a–57c, elements 57b–57d, elements 57c–57e, and elements 57d–57f. The three transmitting and receiving channels 58a, 58b, 58c are successively connected to the four sub-arrays by a sector select switch matrix 59. Each transmitting channel is comprised by level and timing control circuitry 60 under the control of digital controller 48 for determining the level and timing of a transmit pulse generated by transmit pulser 61 and applied to one of the transducer elements. The receiving channel for processing the received echo electrical signal is comprised by a preamplifier 62 having a limiter to protect the sensitive preamplifier inputs from the high transmitting voltage, and a compression amplifier 63 to reduce the larger dynamic acoustic range to the smaller range a cathode ray tube display device can handle. The amplified echo signal is then fed to a digitally selected analog delay circuit 64 having an associated delay select switch matrix 65 which, under the control of digital controller 48, selects the delay element or elements to focus the echo signal. The other transmitting and receiving channels are identical. Digital controller 48 can take various forms and can be a hard-wired logic circuit but is preferably a properly programmed minicomputer or microcomputer with the additional function of controlling sector select switch matrix 59 to determine which subset of three switches is closed.

Assuming that transducer elements 57a–57c are connected to transmitting and receiving channels 58a–58c to make the first sector scan, transducer excitation pulses are generated by the three transmitting channels in time sequence to steer the generated ultrasound beam and control the scan angle. The received echo signals are time-delayed by different preselected amounts in the three receiving channels, and the delayed echo signals are fed to a summing amplifier 66. The focused ultrasound echo signals at the summing amplifier output are now processed through peak reading digital scan converter 67 to convert the sector scan format to raster scan format as here described. Sweep address generators 68 are illustrated here as a separate block and generate the X and Y memory addresses under the control of digital controller 48. Echo amplitude data is written into the sequentially selected memory locations corresponding to image pixels. The time delays are changed and an ultrasound beam is generated at the new scan angle, the received echo signals are delayed and summed, and the largest echo amplitude data is written into the scan converter. This sequence is repeated until the first sector is scanned. Then transducer elements 57b–57d are connected to the three receiving channels and the second sector scan is made scan line by scan line while building up the corresponding image scan line echo data in the scan converter memory. When all the largest echo amplitude data has been written into the scan converter memory, the final four sector image is displayed in real time on cathode ray tube 69 by reading out the stored echo amplitude data in a raster at TV rates.

Instead of displaying the image in real time on a cathode ray tube, the digital data can as previously described be transferred to a storage medium for permanent storage. Digital image storage allows one to perform extensive data processing on the image data. Full dynamic range images can be stored and retrieved for later study. Also, the peak detecting digital scan converter has utility in other types of ultrasonic imaging systems having overlapping scan patterns.

The components of the peak detecting digital scan converter can be standard integrated circuits or conventional circuits as are presently known in the art. Random access memory 15 can be the same type memory as in current x-ray computerized tomography (CT) display systems, such as Type 4402B manufactured by Electronic Memories and Magnetics Corp. of Phoenix, Ariz.

While the invention has been particularly shown and described with reference to several preferred embodiments thereof, it will be understood by those skilled in the art that various changes in form and details may be made therein without departing from the spirit and scope of the invention.

The invention claimed is:

1. A peak detecting digital scan converter for converting ultrasound echo signals in multi-sector scan format to raster format for display in a cathode ray tube, said multi-sector scan being performed using a linear transducer array divisible into sub-arrays such that the origin points of sequential sector scans made by each sub-array are displaced longitudinally along the array and the scans are overlapping, comprising:
   a random access digital memory having a matrix of memory cell locations each corresponding to an image pixel, said memory locations being accessed for the writing of incoming digital echo amplitude data and for the reading out of stored echo amplitude data by the coincidence of memory address signals on X and Y select lines,
   an input analog-to-digital converter for digitizing input echo signals and an output digital-to-analog converter for converting the stored echo amplitude data read out of each memory location to an analog output signal,
   sweep address generator circuitry for successively producing preselected digital X and Y line memory address signals which increment at predetermined intervals and which in combination define an angulated scan line, said X line memory address signals being offset in dependence upon the sector being imaged, a comparator circuit operative to compare the instantaneous input echo signal with the output signal read out of a currently addressed memory location and further operative to condition said random access memory to write digitized echo amplitude data into that memory location only when the incoming echo amplitude data is larger, and means for reading out the stored largest echo amplitude data by sequentially generating X and Y line memory address signals in a raster at television rates.

2. A scan converter according to claim 1 wherein said sweep address generator circuitry is comprised of means for generating an X address linear ramp voltage with an inclination proportional to the sine of the angulated scan line being imaged and for simultaneously generating a corresponding Y address linear ramp voltage with an inclination proportional to the cosine of the angulated scan line being imaged, said last-mentioned means including a pair of read-only memories having stored sine and cosine coefficients, a digital-to-analog converter connected to each read-only memory, and an integrator connected to each converter, means for summing a plurality of dc voltage levels with said X address ramp voltage in dependence upon the sector being imaged, and means for converting said linear ramp voltages to the digitized X and Y line memory address signals.

3. A scan converter according to claim 1 wherein said sweep address circuitry is comprised by digital logic including means for generating first clock pulses having a frequency proportional to the sine of the angulated scan line being imaged, a reversible binary counter with preset inputs which is actuated by said first clock pulses and generates at the outputs thereof said digitized X line memory address signals, and a data latch connected to the input data terminals of said reversible counter to selectively preset the count at which further counting begins depending on the sector being imaged, and means for generating second clock pulses having a frequency proportional to the cosine of the angulated scan line being imaged, and another binary counter which is actuated by said second clock pulses and generates at the outputs thereof said digitized Y line memory address signals, said means for generating first clock pulses and said means for generating second clock pulses including a pair of read-only memories having stored sine and cosine coefficients, a rate multiplier connected to each read-only memory, and a master clock connected to the input of each rate multiplier and feeding pulses thereto at a preselected frequency.

* * * * *